(12) United States Patent
Van Vuren et al.

(10) Patent No.: US 12,266,967 B2
(45) Date of Patent: Apr. 1, 2025

(54) ENERGY TRANSFERENCE FOR CONTROLLED SHUTDOWN OF MARINE ELECTRONIC DEVICE

(71) Applicant: NAVICO, INC., Tulsa, OK (US)

(72) Inventors: Ruan Van Vuren, Auckland (NZ); Alan Van Gerve, Torbay (NZ)

(73) Assignee: Navico, Inc., Tulsa, OK (US)

( * ) Notice: Subject to any disclaimer, the term of this patent is extended or adjusted under 35 U.S.C. 154(b) by 37 days.

(21) Appl. No.: 18/354,032

(22) Filed: Jul. 18, 2023

(65) Prior Publication Data

US 2025/0030268 A1    Jan. 23, 2025

(51) Int. Cl.

| | |
|---|---|
| *H02J 9/06* | (2006.01) |
| *B60R 16/033* | (2006.01) |
| *B63J 3/00* | (2006.01) |
| *G01S 15/89* | (2006.01) |
| *H02H 7/20* | (2006.01) |
| *H02J 9/00* | (2006.01) |

(52) U.S. Cl.
CPC .............. *H02J 9/00* (2013.01); *B60R 16/033* (2013.01); *G01S 15/89* (2013.01); *H02H 7/20* (2013.01); *H02J 9/068* (2020.01); *B63J 2003/002* (2013.01)

(58) Field of Classification Search
CPC ....... B60R 16/03; B60R 16/033; B63B 49/00; B63J 2003/001; B63J 2003/002; G01S 15/89; G01S 15/96; G01C 21/203; H02H 7/20; H02J 9/00; H02J 9/04; H02J 9/06; H02J 9/061; H02J 9/068

See application file for complete search history.

(56) References Cited

U.S. PATENT DOCUMENTS

| | | | |
|---|---|---|---|
| 2012/0214550 A1* | 8/2012 | Galaro | H04W 52/0206 455/561 |
| 2018/0187447 A1* | 7/2018 | Gharabegian | E04H 15/28 |
| 2018/0317104 A1* | 11/2018 | Shaw | H04W 76/10 |
| 2021/0080260 A1* | 3/2021 | Tremblay | G01C 21/1656 |
| 2021/0302966 A1* | 9/2021 | Zhang | G05D 1/0206 |

* cited by examiner

*Primary Examiner* — Levi Gannon
(74) *Attorney, Agent, or Firm* — Nelson Mullins Riley & Scarborough LLP

(57) ABSTRACT

Example systems and methods are provided herein for providing for a controlled shutdown of a marine electronic device. Such marine electronic devices include a main unit, a power input in connection with the main unit, and a secondary unit configured to store energy for processing sonar data. The power input is configured to provide energy to the main unit, and the secondary unit is connectable to the main unit to provide stored energy to the main unit. Also included is a processor configured to determine whether the power input is providing energy within a predetermined threshold to the main unit and then, in response to a determination that the power input is not providing energy within the predetermined threshold to the main unit, cause the secondary unit to provide the stored energy to the main unit.

20 Claims, 7 Drawing Sheets

ENERGY TRANSFERENCE FOR CONTROLLED SHUTDOWN OF MARINE ELECTRONIC DEVICE

FIELD OF THE INVENTION

Example embodiments of the present invention generally relate to marine electronic devices and, more particularly to, systems and methods for providing a controlled shutdown of a marine electronic device.

BACKGROUND

Marine electronic devices are frequently used to process data and to display information to a user on a watercraft. In many scenarios, however, power may be abruptly disconnected or otherwise lost from the marine electronic device. For example, if the marine electronic device is unplugged, or if a battery within the marine electronic device is removed, data being transferred and/or saved at the time of the power failure may be lost or misplaced (among other problems). Further, in some cases, such abrupt shutdowns can cause flash memory and/or secure digital (SD) card memory modules to become corrupted, thus rendering the corresponding data for the marine electronic device inoperable. Improvements to the foregoing are desired.

BRIEF SUMMARY

Some example embodiments of the present invention include marine electronic devices and related systems that are configured to provide an alternative power source to the marine electronic device to allow a shutdown process to be properly completed. For example, some modern marine electronic devices use large capacitors to store energy for sonar functions, and this energy can be used to ensure a complete and proper shutdown of the marine electronic device. The capacitors may be within the marine electronic device or external (but still connected) to the marine electronic device.

In some embodiments, a system may include a main unit and a secondary unit. The main unit may be regularly connected to a power input, and the system may be configured such that energy from the secondary unit is transferable to the main unit when energy from the power input moves outside of a predetermined threshold. In the foregoing example in which the secondary unit is for sonar functions and the secondary energy source is capacitors in the secondary unit that have a regular purpose related to the sonar functions, the system may include a detection circuit for detecting a loss of power to the main unit and then a harvesting circuit, which is connected to the capacitors, that is configured to transfer stored energy from the capacitors to the main unit, such as at least until a proper shutdown process can be completed (or until the stored energy from the capacitors is depleted). This may allow for marine electronic devices to be shutdown without losing data or otherwise malfunctioning even when power is abruptly lost.

In an example embodiment, a marine electronic device is provided. The marine electronic device includes a main unit and a power input in connection with the main unit. The power input is configured to provide energy to the main unit. The marine electronic device also includes a secondary unit configured to store energy for processing sonar data, and the secondary unit is connectable to the main unit to provide stored energy to the main unit. The marine electronic device also includes a processor and a memory including computer executable instructions, and the computer executable instructions are configured to, when executed by the processor, cause the processor to determine whether the power input is providing energy within a predetermined threshold to the main unit and in response to a determination that the power input is not providing energy within the predetermined threshold to the main unit, cause the secondary unit to provide at least some of the stored energy to the main unit.

In some embodiments, the secondary unit may be configured to process sonar data in a first mode, and the secondary unit may be configured to switch to a second mode in which the secondary unit provides power to the main unit from one or more capacitors of the secondary unit.

In some embodiments, the secondary unit may be configured to switch from the first mode to the second mode to enable completion of a controlled shutdown of the marine electronic device.

In some embodiments, the processor may be further configured to, in response to the determination that the power input is not providing energy within the predetermined threshold to the main unit, cause the secondary unit to provide the stored energy to the main unit while the main unit completes a shutdown process.

In some embodiments, the shutdown process may include saving data to the memory or to a second memory.

In some embodiments, the processor may be further configured to, in response to the determination that the power input is not providing energy within the predetermined threshold to the main unit, cause the secondary unit to provide the stored energy to the main unit while the main unit shuts down such that data is saved before the shutdown process is completed.

In some embodiments, the processor may be further configured to, in response to the determination that the power input is not providing energy within the predetermined threshold to the main unit, cause the secondary unit to provide the stored energy to the main unit until the secondary unit contains no energy.

In some embodiments, the secondary unit may include one or more capacitors.

In some embodiments, the marine electronic device may further include a detection circuit in communication with at least the power input, and the detection circuit may be used to determine whether the power input is providing energy to the main unit within the predetermined threshold.

In some embodiments, the detection circuit may be configured to detect a voltage level of the amount of energy traveling from the power input to the main unit, and the predetermined threshold may be a voltage value or a range of voltage values.

In some embodiments, the marine electronic device may further include a harvesting circuit connecting the secondary unit to the main unit, and the processor may be configured to cause the secondary unit to provide the stored energy to the main unit through the harvesting circuit.

In another example embodiment, a method for providing for a controlled shutdown of a marine electronic device is provided. The method includes determining whether a power input is providing energy within a predetermined threshold to a main unit. The power input is in connection with the main unit, and the power input is configured to provide energy to the main unit. The method also includes, in response to a determination that the power input is not providing energy within the predetermined threshold to the main unit, causing a secondary unit to provide energy to the main unit. The secondary unit is configured to store energy for processing sonar data, and the secondary unit is connectable to the main unit to provide at least some of the stored energy to the main unit.

In some embodiments, the secondary unit may be configured to process sonar data in a first mode, and the secondary unit may be configured to switch to a second mode in which the secondary unit provides power to the main unit from one or more capacitors of the secondary unit.

In some embodiments, the method may further include switching the secondary unit from the first mode to the second mode to enable completion of a controlled shutdown of the marine electronic device.

In some embodiments, determining whether the power input is providing energy within the predetermined threshold to the main unit may further include using a detection circuit that is in communication with at least the power input to determine whether the power input is providing energy to the main unit within the predetermined threshold.

In some embodiments, the detection circuit may be configured to detect a voltage level of the amount of energy traveling from the power input to the main unit, and the predetermined threshold may be a voltage value or a range of voltage values.

In some embodiments, causing the secondary unit to provide energy to the main unit may further include using a harvesting circuit that connects the secondary unit to the main unit to cause the secondary unit to provide the stored energy to the main unit.

In another example embodiment, a system for controlling a shutdown of a device is provided. The system includes a main unit and a power input in connection with the main unit, and the power input is configured to provide energy to the main unit. The system also includes a secondary unit configured to store energy for a secondary purpose, and the secondary unit is connectable to the main unit to provide stored energy to the main unit. The system also includes a processor and a memory including computer executable instructions, and the computer executable instructions are configured to, when executed by the processor, cause the processor to determine whether the power input is providing energy within a predetermined threshold to the main unit and in response to a determination that the power input is not providing energy within the predetermined threshold to the main unit, cause the secondary unit to provide at least some of the stored energy to the main unit.

In some embodiments, the secondary unit may be configured to process sonar data in a first mode, and the secondary unit may be configured to switch to a second mode in which the secondary unit provides power to the main unit from one or more capacitors of the secondary unit.

In some embodiments, the secondary unit may be configured to switch from the first mode to the second mode to enable completion of a controlled shutdown of the device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
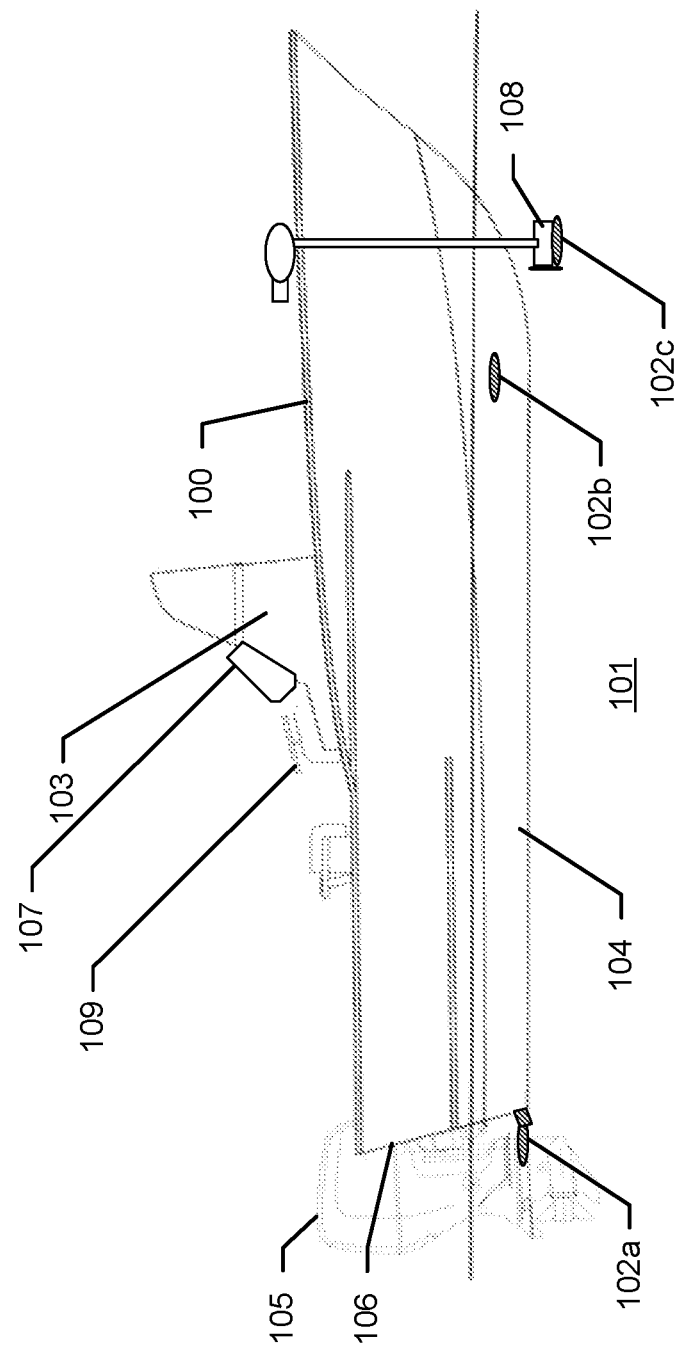
FIG. 1 shows an example watercraft, in accordance with some embodiments described herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

FIG. 1 shows a watercraft 100 (e.g., a vessel) configured to traverse a marine environment, e.g., body of water 101. The watercraft 100 may be a surface watercraft, a submersible watercraft, or any other implementation known to those skilled in the art. The watercraft 100 may include one or more marine electronic devices 107, such as may be utilized by a user to interact with, view, or otherwise control various aspects of the watercraft and its various marine systems described herein. In the illustrated embodiment, the marine electronic device 107 is positioned proximate the helm (e.g., steering wheel 109) of the watercraft 100 on a console 103—although other places on the watercraft 100 are contemplated. Likewise, additionally or alternatively, a user's mobile device may include functionality of a marine electronic device.

Depending on the configuration, the watercraft 100 may include a main propulsion motor 105, such as an outboard or inboard motor. Additionally, the watercraft 100 may include a trolling motor 108 configured to propel the watercraft 100 or maintain a position. The motor 105 and/or the trolling motor 108 may be steerable using steering wheel 109, or in some embodiments, the watercraft 100 may have a navigation assembly that is operable to steer the motor 105 and/or the trolling motor 108. The navigation assembly may be connected to a processor and/or be within a marine electronic device 107, or it may be located anywhere else on the watercraft 100. Alternatively, it may be located remotely.

As depicted in FIG. 1, the watercraft 100 may use one or more sonar transducer assemblies 102a, 102b, and 102c disposed on and/or proximate to the watercraft. The transducer assemblies 102a, 102b, and 102c may each include one or more transducer elements (such as in the form of arrays) configured to transmit sound waves into a body of water, receive sonar returns from the body of water, and convert the sonar returns into sonar return data. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

Figure 2:
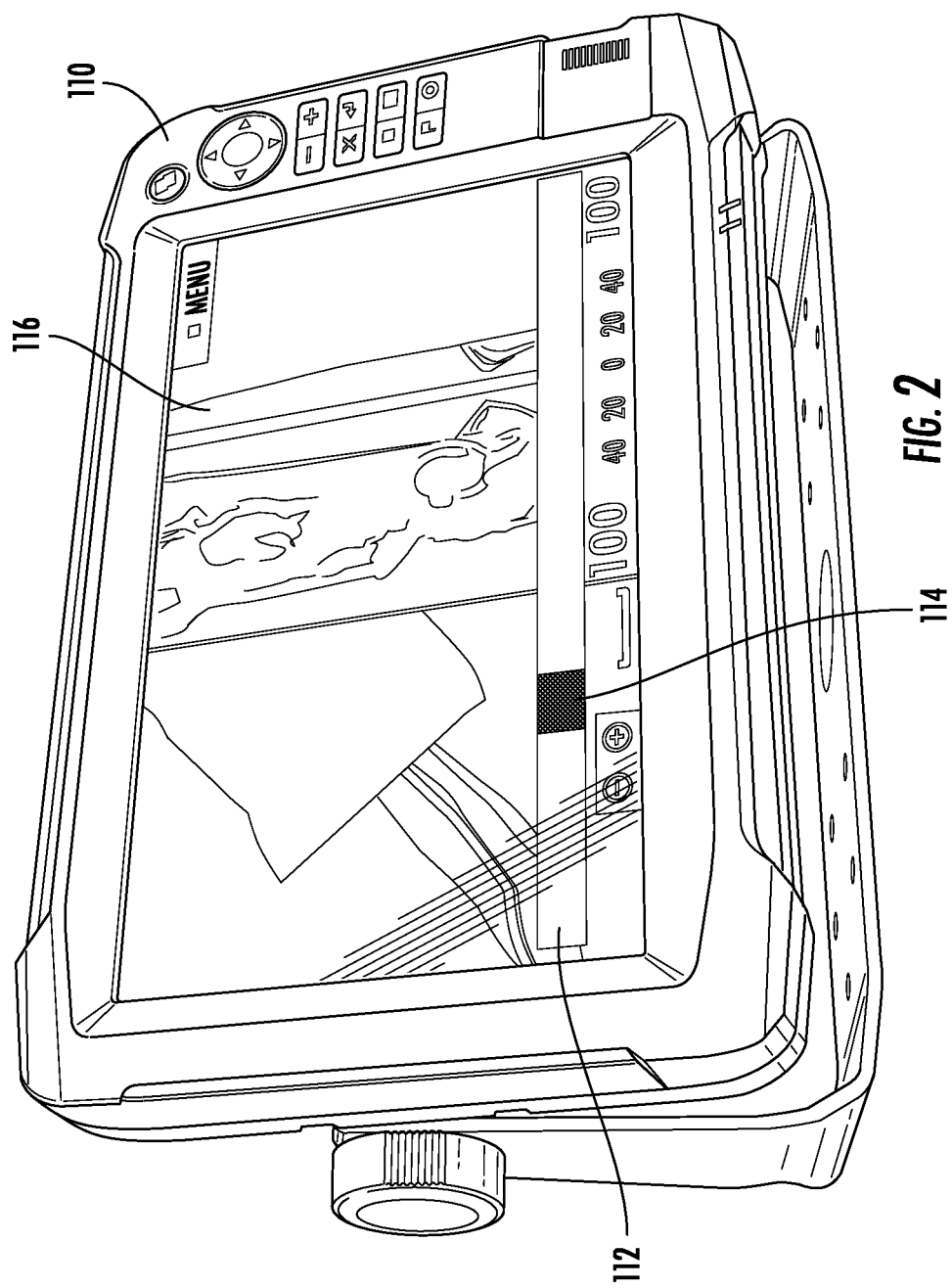
FIG. 2 shows an example marine electronic device with an illustration indicating data is being saved, wherein a secondary unit is within the marine electronic device, in accordance with some embodiments described herein.

FIG. 2 shows a marine electronic device 110 that includes a screen 116. In the embodiment shown, the screen 116 is displaying an indication that data is being saved and/or that a process that is taking place has not reached completion. For example, the icon 114 is moving along the bar 112 to show an amount of progress that has been made in, e.g., saving a portion of data to a memory. In many cases, if power to the marine electronic device 110 ceases during a saving of data (or similar process), unwanted outcomes such as loss of data and/or malfunctioning of the entire marine electronic device 110 can occur.

The embodiments disclosed herein provide systems for preventing data loss and other unwanted outcomes when power to the marine electronic device 110 ceases. For example, some embodiments use energy from a secondary unit, such as capacitors from a sonar system, to provide power to a marine electronic device while a shutdown process is completed.

In the embodiment illustrated in FIG. 2, the marine electronic device 110 may include both a main unit and a secondary unit within a housing of the marine electronic device 110, and the main unit may be connected to a power input. The power input may be configured to provide energy to the main unit. For example, the power input may include a battery, a wired connection, or any other power input configuration.

In some embodiments, the secondary unit may be configured to process sonar data and/or to create one or more sonar images. For example, the secondary unit may be connected to one or more transducer assemblies capable of emitting acoustic beams into an underwater environment and then receiving sonar return beams that are formed into sonar return data. The secondary unit may then be used to process those sonar return data, such as to determine information about the underwater environment and/or to create sonar image(s).

The secondary unit may be further configured to store energy for processing sonar data. For example, the secondary unit may be configured with one or more capacitors that connect to at least one of a sonar signal processor and one or more sonar transducers, which may also be positioned within the secondary unit. The one or more capacitors may store and provide energy to the at least one of a sonar signal processor and one or more sonar transducers. As will be described herein, the secondary unit may be connectable to the main unit to provide stored energy to the main unit in certain scenarios. In some embodiments, the secondary unit may be within the marine electronic device 110, as shown in FIG. 2.

In some embodiments, the secondary unit may be configured to process sonar data in a first mode, and the secondary unit may be further configured to switch to a second mode in which the secondary unit provides power to the main unit from one or more capacitors of the secondary unit. For example, the secondary unit may be configured to switch from the first mode to the second mode to initiate a controlled shutdown of the marine electronic device 110.

The marine electronic device 110 may also include, either locally or remotely, a processor and a memory. The memory may include computer executable instructions configured to, when executed by the processor, cause the processor to determine whether the power input is providing energy within a predetermined threshold to the main unit and then, in response to a determination that the power input is not providing energy within the predetermined threshold to the main unit, cause the secondary unit to provide the stored energy to the main unit. For example, the processor may be configured to cause the secondary unit to provide the stored energy to the main unit while the main unit completes a shutdown process, e.g., that includes saving data to the memory or to a second memory. Additionally or alternatively, the processor may be configured to cause the secondary unit to provide the stored energy to the main unit while the main unit shuts down such that data is saved before the shutdown process is completed.

In some embodiments, the processor may be configured to cause the secondary unit to provide the stored energy to the main unit until the secondary unit contains no energy. In other embodiments, however, the processor may be configured to cause the secondary unit to provide the stored energy to the main unit until a predetermined amount of stored energy has been transferred and/or until a shutdown process has been completed. Further, in some other embodiments, the processor may be configured to detect an instance in which the power input to the main unit is restored before the stored energy from the secondary unit runs out. In such example cases, the processor might be configured to abandon the shutdown process and cause the main unit and the secondary unit to return to normal operation. In other embodiments, the processor may be configured to complete the shutdown process despite the restoration of the power input to the main unit and then cause the main unit and the secondary unit to return to normal operation upon a determination that the power input is stable. Other configurations are also contemplated.

This may allow for the marine electronic device 110 to complete a proper shutdown process even when power is abruptly lost. For example, the systems disclosed herein may ensure that all memory procedures are either completed or at least managed in a way that ensures no data is lost. Additionally or alternatively, as another example, in the case of data being loaded (as illustrated in FIG. 2), the proper shutdown process may enable the data that has already been processed to be stored properly such that the marine electronic device 110 can continue loading upon the main power source being turned back on at a later time. Other data saving outcomes are also contemplated.

Figure 3:
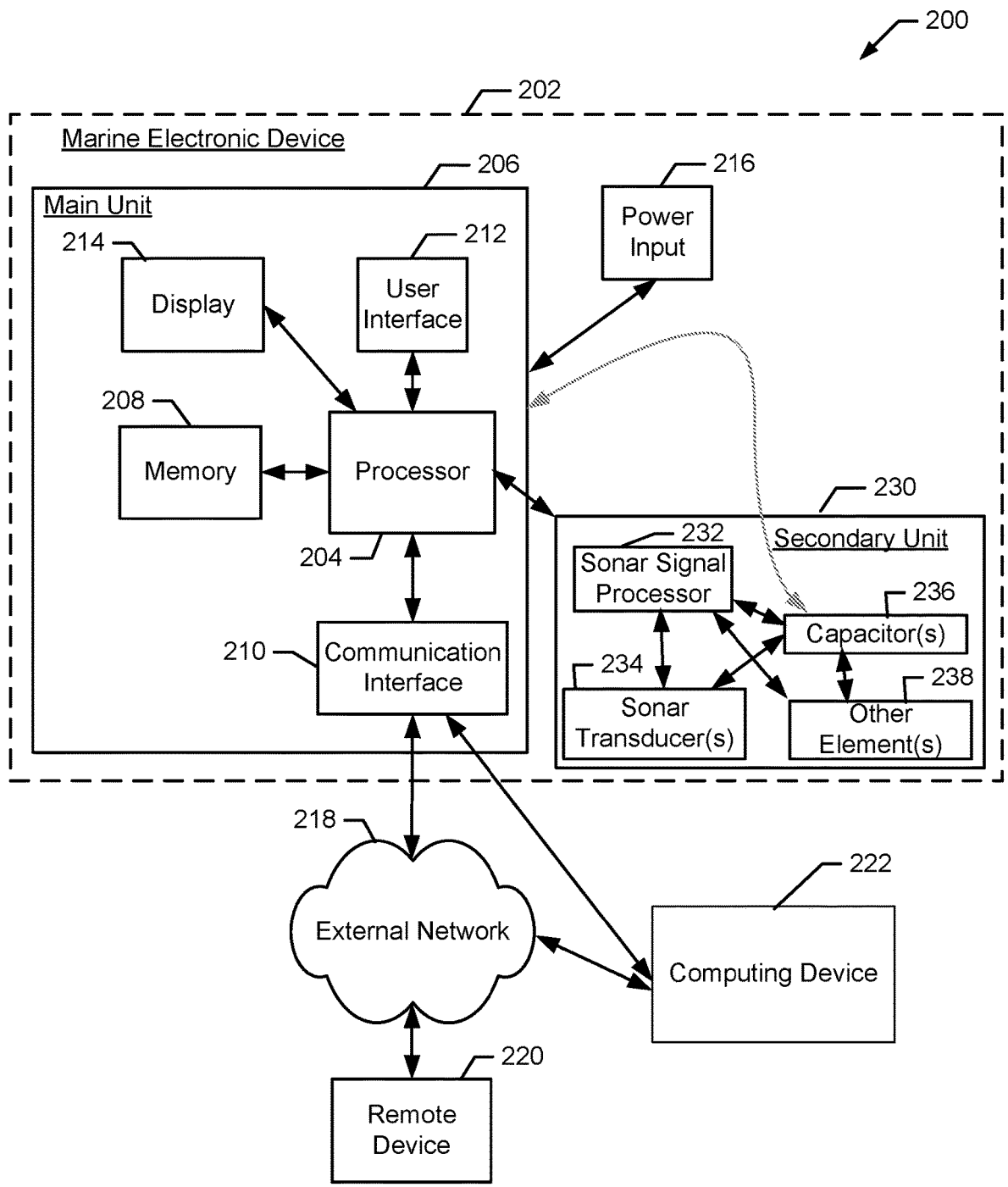
FIG. 3 is a block diagram of an example system capable of providing for a controlled shutdown of a marine electronic device, wherein a secondary unit is located within the marine electronic device, in accordance with some embodiments described herein.

FIG. 3 shows a block diagram of an example system 200 capable for use with several embodiments of the present disclosure. As shown, the system 200 may include a number of different modules or components, each of which may comprise any device or means embodied in either hardware, software, or a combination of hardware and software configured to perform one or more corresponding functions. For example, the system 200 may include a marine electronics device 202 (e.g., controller) and various sensors/system.

The marine electronics device 202 may include a processor 204, a memory 208, a communication interface 210, a user interface 212, and a display 214, which may be contained within a main unit 206. The main unit 206 may be connected to a power input 216. The marine electronics device 202 may also include a secondary unit 230 comprising a sonar signal processor 232, one or more sonar transducer(s) 234, one or more capacitor(s) 236, and/or other elements 238. The one or more capacitor(s) 236 may be configured to store and provide energy to at least one of the one or more sonar transducer(s) 234, the sonar signal processor 232, and/or the other elements 238. Further, in some embodiments, the one or more capacitor(s) 236 (or one of the other element(s) 238) may be configured to provide energy to the main unit 206 in circumstances in which, e.g., energy flowing from the power input 216 to the main unit 206 ceases. This may allow for a controlled shutdown of the marine electronic device 202, as described herein. Notably, while shown as broken into a main unit 206 and a secondary unit 230, in some embodiments, the marine electronics device 202 may be otherwise configured, such as without one or more separate units.

In some embodiments, the system 200 may be configured to receive, process, and display various types of marine data. Additionally, the system 200 may include one or more components that are configured to gather marine data or perform marine features. In such a regard, the processor 204 may be configured to process the marine data and generate one or more images corresponding to the marine data for display on the screen that is integrated in the marine electronics device 202. Further, the system 200 may be configured to communicate with various internal or external components (e.g., through the communication interface 210), such as to provide instructions related to the marine data.

The secondary unit 230 illustrated within the marine electronic device 202 of FIG. 3 includes the sonar signal processor 232, one or more sonar transducer(s) 234, one or more capacitor(s) 236, along with other element(s) 238.

As indicated herein, the sonar signal processor 232 or other processor (although not shown) may be configured to perform various sonar processing. In some embodiments, the processor (e.g., processor 204 in the marine electronic device 202, a processor (or processor portion) in the secondary unit 230, or a remote processor—or combinations thereof) may be configured to filter sonar return data and/or selectively control transducer elements of the transducer arrays. For example, various processing devices (e.g., a multiplexer, a spectrum analyzer, A-to-D converter, etc.) may be utilized in controlling or filtering sonar return data and/or transmission of sonar signals from the one or more sonar transducer(s) 234. Further, the one or more capacitor(s) 236 may be utilized within systems of the secondary unit 230 to perform the sonar processing, such as to store and provide energy to one or more of the sonar signal processor 232, the one or more sonar transducer(s) 234 (e.g., through a transducer interface), and/or the other element(s) 238.

The secondary unit 230 may also include one or more other systems, such as other element(s) 238. For example, the secondary unit 230 may include an orientation sensor, such as gyroscope or other orientation sensor (e.g., accelerometer, MEMS, etc.) that can be configured to determine the relative orientation of the secondary unit 230 and/or the one or more sonar transducer(s) 234—such as with respect to a waterline, the top surface of the body of water, the floor of the body of water, or other reference. In some embodiments, additionally or alternatively, other types of sensor(s) are contemplated, such as, for example, a water temperature sensor, a current sensor, a light sensor, a wind sensor, a speed sensor, or the like.

The processor 204 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 204 as described herein. In this regard, the processor 204 may be configured to analyze electrical signals communicated thereto to provide display data to the display.

The memory 208 may be configured to store instructions, computer program code, marine data (e.g., sonar data, chart data, location/position data, sensor data), and/or other data associated with the system 200 in a non-transitory computer readable medium for use by the processor, for example.

The system 200 may also include one or more communications modules configured to communicate via any of many known manners, such as via a network, for example. The processing circuitry and communication interface 210 may form a processing circuitry/communication interface. The communication interface 210 may be configured to enable connections to external systems (e.g., an external network 218 or one or more remote controls, such as a handheld remote control, marine electronics device, foot pedal, or other remote computing device). In this regard, the communication interface (e.g., 210) may include one or more of a plurality of different communication backbones or frameworks, such as Ethernet, USB, CAN, NMEA 2000, GPS, Sonar, cellular, WiFi, and/or other suitable networks, for example. In this manner, the processor 204 may retrieve stored data from a remote, external server via the external network 218 in addition to or as an alternative to the onboard memory 208. Numerous other peripheral, remote devices such as one or more wired or wireless multi-function displays may be connected to the system 200.

The processor 204 may configure the device and/or circuitry to perform the corresponding functions of the processor 204 as described herein. In this regard, the processor 204 may be configured to analyze electrical signals communicated thereto to provide, for example, various features/functions described herein.

In some embodiments, the system 200 may be configured to determine the location of the marine vessel, such as through a location sensor. The system 200 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 204 may be configured to act as a navigation system. For example, the processor 204 may generate at least one navigation path and, in some cases, generate an image of a chart along with the navigation path for display by the screen. The location of the vessel and/or routes may be displayed on a navigation chart on a display remote from the system 200. Further, additional navigation features (e.g., providing directions, weather information, etc.) are also contemplated.

In any of the embodiments, the display 214 may be configured to display an indication of the current direction of the marine vessel.

The display 214 may be configured to display images and may include or otherwise be in communication with a user interface 212 configured to receive input from a user. The display 214 may be, for example, a conventional liquid crystal display (LCD), LED/OLED display, touchscreen display, mobile media device, and/or any other suitable display known in the art, upon which images may be displayed. In some embodiments, the display 214 may be the MFD and/or the user's mobile media device. The display may be integrated into the marine electronic device 202. In some example embodiments, additional displays may also be included, such as a touch screen display, mobile media device, or any other suitable display known in the art upon which images may be displayed.

In some embodiments, the display 214 may present one or more sets of marine data and/or images generated therefrom. Such marine data may include chart data, radar data, weather data, location data, position data, orientation data, sonar data, and/or any other type of information relevant to the marine vessel. In some embodiments, the display 214 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 214 and/or user interface 212 may be a screen that is configured to merely present images and not receive user input. In other embodiments, the display 214 and/or user interface 212 may be a screen configured to receive user input in some form. For example, the screen may be a touchscreen that enables touch input from a user. Additionally or alternatively, the user interface may include one or more buttons (not shown) that enable user input. Additionally, the display 214 may be configured to display other relevant information including, but not limited to, speed data, motor data battery data, current operating mode, auto pilot, or the like.

The user interface 212 may include, for example, a keyboard, keypad, function keys, mouse, scrolling device, input/output ports, touch screen, or any other mechanism by which a user may interface with the system.

In some embodiments, the power input 216 (e.g., battery) may be configured to provide power to the main unit 206 and/or other various components. In some embodiments, the power input 216 may be rechargeable (e.g., a rechargeable battery). Further, in some embodiments, the power input 216 may be a wired connection. Other configurations of the power input 216 are also contemplated. In some example embodiments, the system 200 may include a sensor and/or a detection circuit for determining whether the power input 216 is providing energy within a predetermined threshold to the main unit 206. For example, the battery sensor and/or detection circuit may include a current sensor or voltage sensor configured to measure the current supply of the power input 216. The sensor and/or detection circuit may be configured to measure individual battery cells or measure a battery bank, or in a wired connection scenario, the sensor or detection circuit may be configured to detect a presence and flow of energy. The processor 204 may receive data from the sensor and/or detection circuit and determine the remaining energy in the power input 216. In an example embodiment, the voltage or current measured by the sensor and/or detection circuit may be compared to a reference value or data table, stored in memory 208, to determine the remaining energy in the power input 216.

The processor 204 may be further configured to determine an instance in which the power input 216 is not providing energy to the main unit 206 within the predetermined threshold and then cause an element from the secondary unit 230 to provide stored energy to the main unit 206. This may allow for a controlled shutdown of the marine electronic device 202 to occur even when the power input 216 suddenly or unexpectedly ceases. In the embodiment shown in FIG. 3, the one or more capacitor(s) 236 within the secondary unit 230 are configured to be able to optionally supply stored energy to the main unit 206. However, in other embodiments, one or more of the other element(s) 238 may be used to provide the stored energy to the main unit 206 in circumstances in which the power input 216 is not providing energy within the predetermined threshold to the main unit 206.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 200 may include a computer device or system 222 (e.g., mobile media device) into which implementations of various technologies and techniques described herein may be implemented. Computing device 222 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 202 described herein may be referred to as a marine device or as an MFD. The marine electronic device 202 may include one or more components disposed at various locations on a marine vessel. Such components may include one or more data modules, sensors, instrumentation, and/or any other devices known to those skilled in the art that may transmit various types of data to the marine electronic device 202 for processing and/or display. The various types of data transmitted to the marine electronic device 202 may include marine electronics data and/or other data types known to those skilled in the art. The marine data received from the marine electronic device 202 or system 200 may include chart data, sonar data, structure data, radar data, navigation data, position data, heading data, automatic identification system (AIS) data, Doppler data, speed data, course data, or any other type known to those skilled in the art.

The marine electronic device 202 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 202 may be attached to various buses and/or networks, such as a National Marine Electronics Association (NMEA) bus or network, for example. The marine electronic device 202 may send or receive data to or from another device attached to the NMEA 2000 bus. For instance, the marine electronic device 202 may transmit commands and receive data from a motor or a sensor using an NMEA 2000 bus. In some implementations, the marine electronic device 202 may be capable of steering a marine vessel and controlling the speed of the marine vessel (e.g., autopilot). For instance, one or more waypoints may be input to the marine electronic device 202, and the marine electronic device 202 may be configured to steer the marine vessel to the one or more waypoints. Further, the marine electronic device 202 may be configured to transmit and/or receive NMEA 2000 compliant messages, messages in a proprietary format that do not interfere with NMEA 2000 compliant messages or devices, and/or messages in any other format. In various other implementations, the marine electronic device 202 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 202 may communicate with various other devices on the marine vessel via wireless communication channels and/or protocols.

In some implementations, the marine electronic device 202 may be connected to a global positioning system (GPS) receiver. The marine electronic device 202 and/or the GPS receiver may be connected via a network interface. In this instance, the GPS receiver may be used to determine position and coordinate data for a marine vessel on which the marine electronic device 202 is disposed. In some instances, the GPS receiver may transmit position coordinate data to the marine electronic device 202. In various other instances, any type of known positioning system may be used to determine and/or provide position coordinate data to/for the marine electronic device 202.

The marine electronic device 202 may be configured as a computing system similar to computing device 222.

Figure 4:
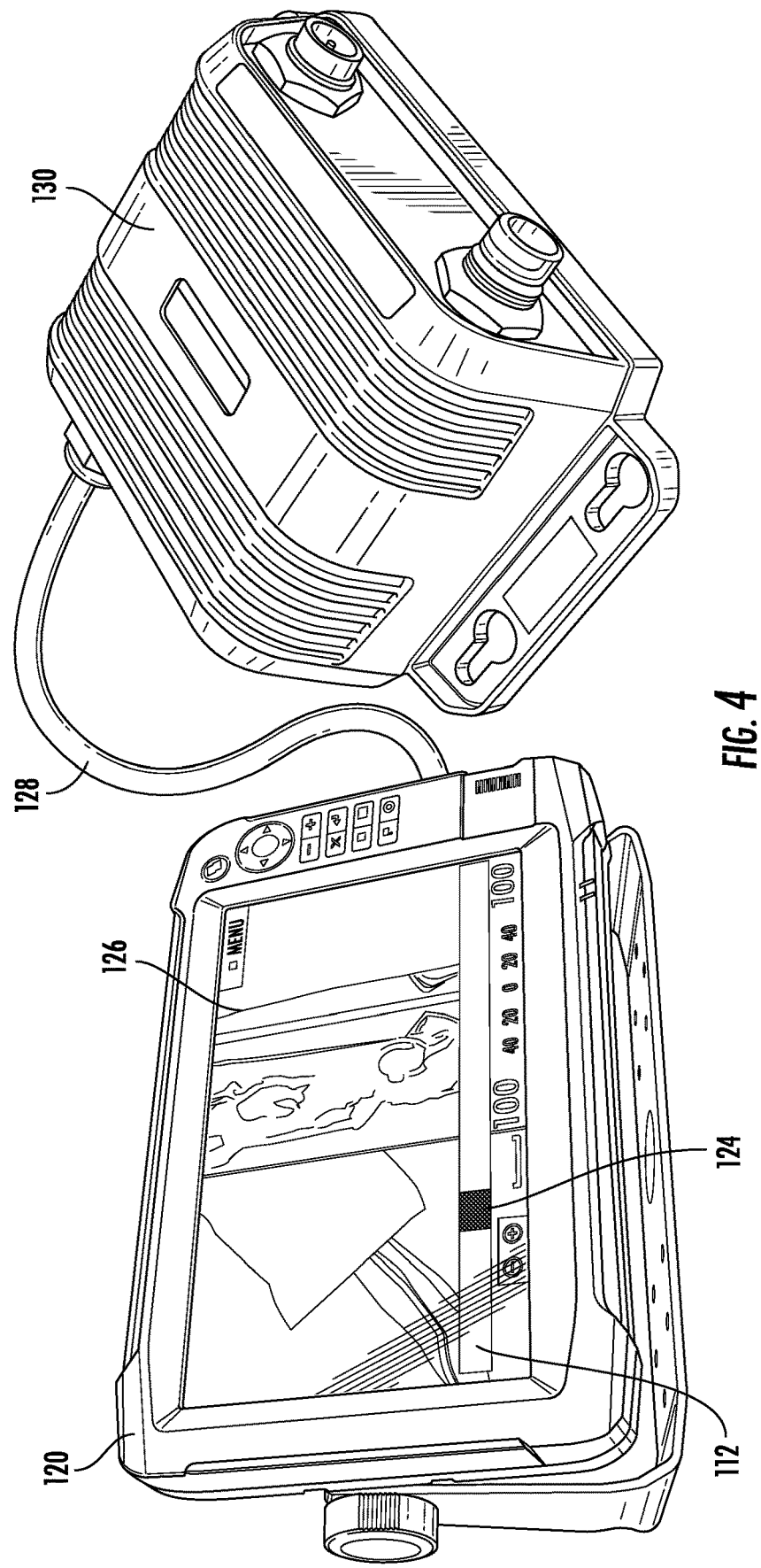
FIG. 4 shows another example marine electronic device with an illustration indicating data is being saved, wherein a secondary unit is separate from and connected to the marine electronic device, in accordance with some embodiments described herein.

FIG. 4 shows a marine electronic device 120 that includes a screen 126. In the embodiment shown, the screen 126 is displaying an indication that data is being saved and/or that a process that is taking place has not reached completion. For example, the icon 124 is moving along the bar 122 to show an amount of progress that has been made in, e.g., saving a portion of data to a memory. In many cases, if power to the marine electronic device 120 ceases during a loading of data (or similar process), unwanted outcomes such as loss of data and/or malfunctioning of the entire marine electronic device 120 can occur.

In the embodiment illustrated in FIG. 4, the marine electronic device 120 may include both a main unit and a secondary unit 130 that is positioned outside of a housing of the marine electronic device 120. The secondary unit 130 may be connected to the marine electronic device 120 by a cable 128. Further, the main unit may be connected to a power input. The power input may be configured to provide energy to the main unit. For example, the power input may include a battery, a wired connection, or any other power input configuration.

The secondary unit 130 may be configured to store energy for processing sonar data. For example, the secondary unit 130 may be configured with one or more capacitors that connect to at least one of a sonar signal processor and one or more sonar transducers, which may also be positioned within the secondary unit 130. The one or more capacitors may store and provide energy to the at least one of a sonar signal processor and one or more sonar transducers. As will be described herein, the secondary unit 130 may be connectable to the main unit to provide stored energy to the main unit in certain scenarios.

In some embodiments, the secondary unit 130 may be configured to process sonar data in a first mode, and the secondary unit 130 may be further configured to switch to a second mode in which the secondary unit 130 provides power to the main unit from one or more capacitors of the secondary unit 130. For example, the secondary unit 130 may be configured to switch from the first mode to the second mode to initiate a controlled shutdown of the marine electronic device 120.

The marine electronic device 120 may also include, either locally or remotely, a processor and a memory. The memory may include computer executable instructions configured to, when executed by the processor, cause the processor to determine whether the power input is providing energy within a predetermined threshold to the main unit and then, in response to a determination that the power input is not providing energy within the predetermined threshold to the main unit, cause the secondary unit 130 to provide the stored energy to the main unit. For example, the processor may be configured to cause the secondary unit 130 to provide the stored energy to the main unit while the main unit completes a shutdown process, e.g., that includes saving data to the memory or to a second memory. Additionally or alternatively, the processor may be configured to cause the secondary unit 130 to provide the stored energy to the main unit while the main unit shuts down such that data is saved before the shutdown process is completed.

In some embodiments, the processor may be configured to cause the secondary unit 130 to provide the stored energy to the main unit until the secondary unit 130 contains no energy. In other embodiments, however, the processor may be configured to cause the secondary unit 130 to provide the stored energy to the main unit until a predetermined amount of stored energy has been transferred and/or until a shutdown process has been completed. Further, in some other embodiments, the processor may be configured to detect an instance in which the power input to the main unit is restored before the stored energy from the secondary unit runs out. In such example cases, the processor might be configured to abandon the shutdown process and cause the main unit and the secondary unit to return to normal operation. In other embodiments, the processor may be configured to complete the shutdown process despite the restoration of the power input to the main unit and then cause the main unit and the secondary unit to return to normal operation upon a determination that the power input is stable. Other configurations are also contemplated.

This may allow for the marine electronic device 120 to complete a proper shutdown process even when power is abruptly lost. For example, the systems disclosed herein may ensure that all memory procedures are either completed or at least managed in a way that ensures no data is lost. Additionally or alternatively, as another example, in the case of data being saved (as illustrated in FIG. 4), the proper shutdown process may enable the data that has already been processed to be stored properly such that the marine electronic device 120 can continue loading upon the main power source being turned back on at a later time. Other data saving outcomes are also contemplated.

Figure 5:
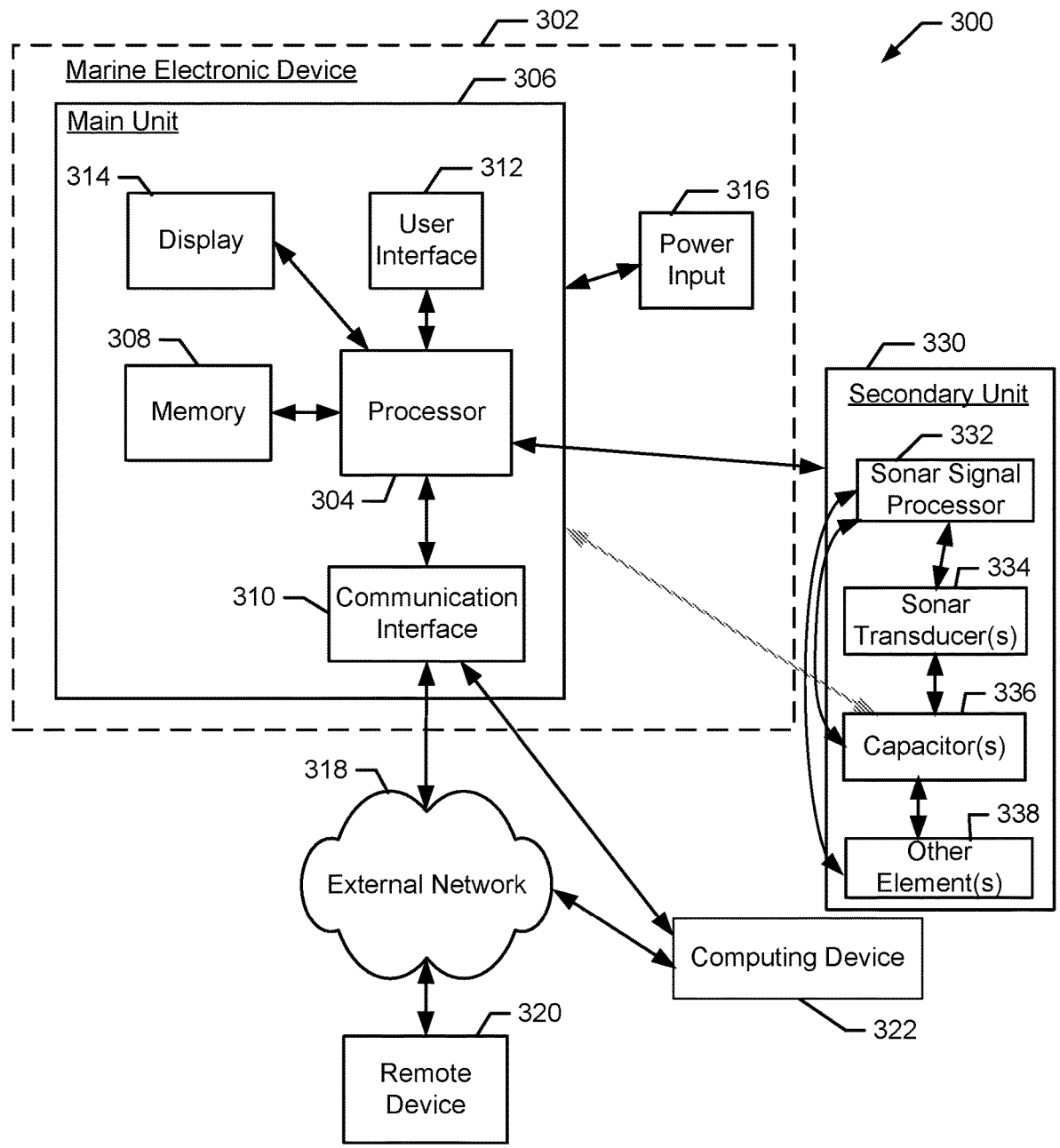
FIG. 5 is a block diagram of another example system capable of providing for a controlled shutdown of a marine electronic device, wherein a secondary unit is separate from and connected to the marine electronic device, in accordance with some embodiments described herein.

FIG. 5 shows a block diagram of another example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller), a separate secondary unit 330, and various sensors/system.

The marine electronics device 302, controller, remote control, MFD, and/or user interface display may include a processor 304, a memory 308, a communication interface 310, a user interface 312, and a display 314, which may be contained within a main unit 306. The main unit 306 may be connected to a power input 316. The system 300 may also include a secondary unit 330 separate from the marine electronic device 302. The secondary unit 330 may comprise a sonar signal processor 332, one or more sonar transducer(s) 334, one or more capacitor(s) 336, and/or other elements 338. The one or more capacitor(s) 336 may be configured to store and provide energy to at least one of the one or more sonar transducer(s) 334, the sonar signal processor 332, and/or the other elements 338. Further, in some embodiments, the one or more capacitor(s) 336 (or one of the other element(s) 338) may be configured to provide energy to the main unit 306 within the marine electronic device 302 in circumstances in which, e.g., energy flowing from the power input 316 to the main unit 306 ceases. This may allow for a controlled shutdown of the marine electronic device 302, as described herein.

In some embodiments, the system 300 may be configured to receive, process, and display various types of marine data. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device 302. Further, the system 300 may be configured to communicate with various internal or external components (e.g., through the communication interface 310), such as to provide instructions related to the marine data.

The secondary unit 330 illustrated within the system 300 of FIG. 5 includes the sonar signal processor 332, one or more sonar transducer(s) 334, one or more capacitor(s) 336, along with other element(s) 338.

As indicated herein, the sonar signal processor 332 or other processor (although not shown) may be configured to perform various sonar processing. In some embodiments, the processor (e.g., processor 304 in the marine electronic device 302, a processor (or processor portion) in the secondary unit 330, or a remote processor—or combinations thereof) may be configured to filter sonar return data and/or selectively control transducer elements of the transducer arrays. For example, various processing devices (e.g., a multiplexer, a spectrum analyzer, A-to-D converter, etc.) may be utilized in controlling or filtering sonar return data and/or transmission of sonar signals from the one or more sonar transducer(s) 334. Further, the one or more capacitor(s) 336 may be utilized within systems of the secondary unit 330 to perform the sonar processing, such as to store and provide energy to one or more of the sonar signal processor 332, the one or more sonar transducer(s) 334 (e.g., through a transducer interface), and/or the other element(s) 338.

The secondary unit 330 may also include one or more other systems, such as other element(s) 338. For example, the secondary unit 330 may include an orientation sensor, such as gyroscope or other orientation sensor (e.g., accelerometer, MEMS, etc.) that can be configured to determine the relative orientation of the secondary unit 330 and/or the one or more sonar transducer(s) 334—such as with respect to a waterline, the top surface of the body of water, the floor of the body of water, or other reference. In some embodiments, additionally or alternatively, other types of sensor(s) are contemplated, such as, for example, a water temperature sensor, a current sensor, a light sensor, a wind sensor, a speed sensor, or the like.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide display data to the display.

The memory 308 may be configured to store instructions, computer program code, marine data (e.g., sonar data, chart data, location/position data, sensor data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 310 may form a processing circuitry/communication interface. The communication interface 310 may be configured to enable connections to external systems (e.g., an external network 318 or one or more remote controls, such as a handheld remote control, marine electronics device, foot pedal, or other remote computing device). In this regard, the communication interface (e.g., 310) may include one or more of a plurality of different communication backbones or frameworks, such as Ethernet, USB, CAN, NMEA 2000, GPS, Sonar, cellular, WiFi, and/or other suitable networks, for example. In this manner, the processor 304 may retrieve stored data from a remote, external server via the external network 318 in addition to or as an alternative to the onboard memory 308. Numerous other peripheral, remote devices such as one or more wired or wireless multi-function displays may be connected to the system 300.

The processor 304 may configure the device and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location of the marine vessel, such as through a location sensor. The system 300 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one navigation path and, in some cases, generate an image of a chart along with the navigation path for display by the screen. The location of the vessel and/or routes may be displayed on a navigation chart on a display remote from the system 300. Further, additional navigation features (e.g., providing directions, weather information, etc.) are also contemplated.

In any of the embodiments, the display 314 may be configured to display an indication of the current direction of the marine vessel.

The display 314 may be configured to display images and may include or otherwise be in communication with a user interface 312 configured to receive input from a user. The display 314 may be, for example, a conventional liquid crystal display (LCD), LED/OLED display, touchscreen display, mobile media device, and/or any other suitable display known in the art, upon which images may be displayed. In some embodiments, the display 314 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 314 may present one or more sets of marine data and/or images generated therefrom. Such marine data may include chart data, radar data, weather data, location data, position data, orientation data, sonar data, and/or any other type of information relevant to the marine vessel. In some embodiments, the display 314 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 314 and/or user interface 312 may be a screen that is configured to merely present images and not receive user input. In other embodiments, the display 314 and/or user interface 312 may be a screen configured to receive user input in some form. For example, the screen may be a touchscreen that enables touch input from a user. Additionally or alternatively, the user interface may include one or more buttons (not shown) that enable user input. Additionally, the display 314 may be configured to display other relevant information including, but not limited to, speed data, motor data battery data, current operating mode, auto pilot, or the like.

The user interface 312 may include, for example, a keyboard, keypad, function keys, mouse, scrolling device, input/output ports, touch screen, or any other mechanism by which a user may interface with the system.

In some embodiments, the power input 316 (e.g., battery) may be configured to provide power to the main unit 306 and/or other various components. In some embodiments, the power input 316 may be rechargeable (e.g., a rechargeable battery). Further, in some embodiments, the power input 316 may be a wired connection. Other configurations of the power input 316 are also contemplated. In some example embodiments, the system 300 may include a sensor and/or a detection circuit for determining whether the power input 316 is providing energy within a predetermined threshold to the main unit 306. For example, the battery sensor and/or detection circuit may include a current sensor or voltage sensor configured to measure the current supply of the power input 316. The sensor and/or detection circuit may be configured to measure individual battery cells or measure a battery bank, or in a wired connection scenario, the sensor or detection circuit may be configured to detect a presence and flow of energy. The processor 304 may receive data from the sensor and/or detection circuit and determine the remaining energy in the power input 316. In an example embodiment, the voltage or current measured by the sensor and/or detection circuit may be compared to a reference value or data table, stored in memory 308, to determine the remaining energy in the power input 316.

The processor 304 may be further configured to determine an instance in which the power input 316 is not providing energy to the main unit 306 within the predetermined threshold and then cause an element from the secondary unit 330 to provide stored energy to the main unit 306. This may allow for a controlled shutdown of the marine electronic device 302 to occur even when the power input 316 suddenly or unexpectedly ceases. In the embodiment shown in FIG. 5, the one or more capacitor(s) 336 within the secondary unit 330 are configured to be able to optionally supply stored energy to the main unit 306. However, in other embodiments, one or more of the other element(s) 338 may be used to provide the stored energy to the main unit 306 in circumstances in which the power input 316 is not providing energy within the predetermined threshold to the main unit 306.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 300 may include a computer device or system 322 (e.g., mobile media device) into which implementations of various technologies and techniques described herein may be implemented. Computing device 322 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 322.

Figure 6:
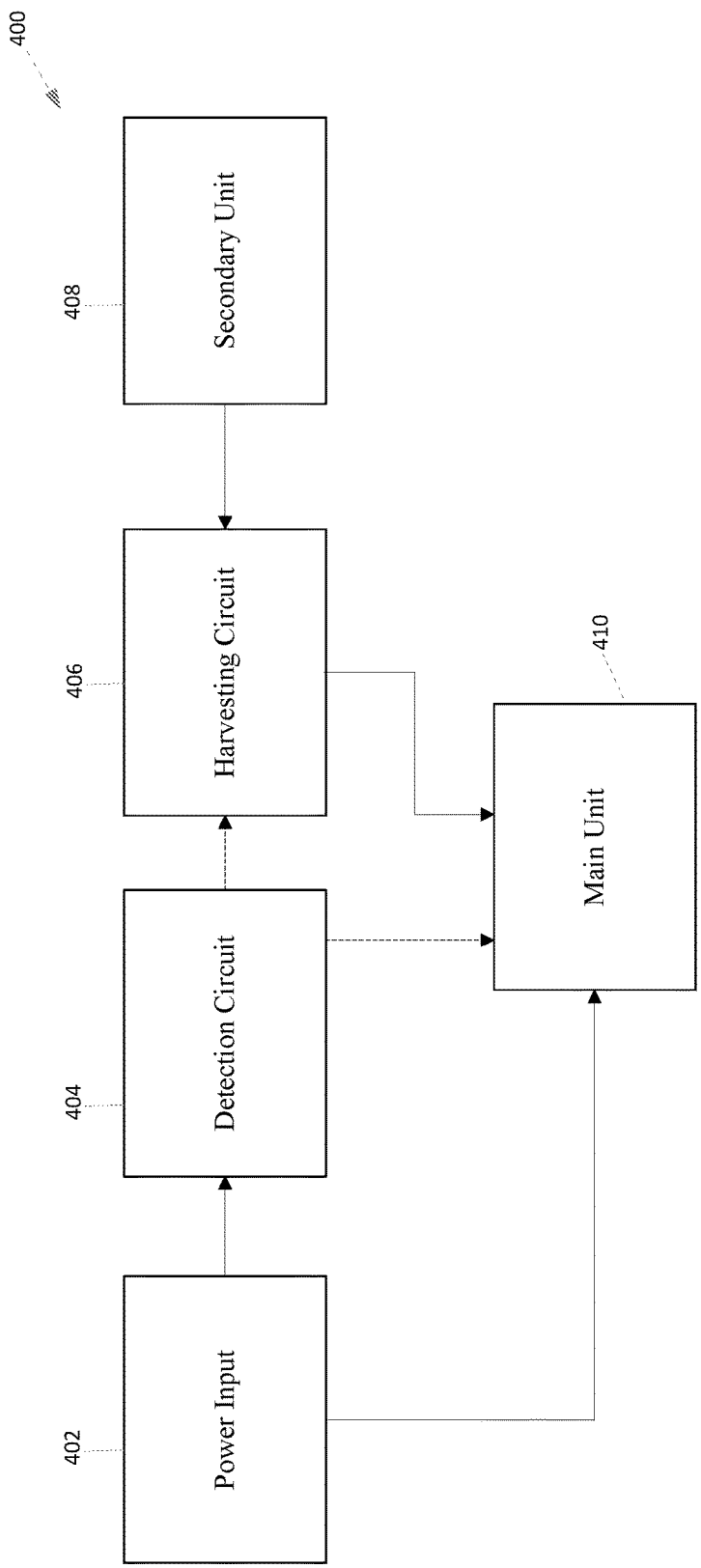
FIG. 6 is a block diagram showing an example system with an example circuit configuration of a marine electronic device, in accordance with some embodiments described herein.

FIG. 6 illustrates a block diagram of an example circuit system 400 configured to direct alternative energy to a main unit 410 to allow for a proper shutdown process to occur within the main unit 410. The circuit system 400 includes a power input 402 that is configured to be the primary source of energy for the main unit 410. The power input 402 is also connected to a detection circuit 404 that is configured to determine whether the power input 402 is providing energy to the main unit 410 within a predetermined threshold. The detection circuit 404 may be configured to detect a voltage level of the amount of energy traveling from the power input 402 to the main unit 410. The predetermined threshold may be a voltage value or a range of voltage values. The circuit system 400 may also include a harvesting circuit 406 that is configured to cause the secondary unit 408 to provide stored energy to the main unit 410 through the harvesting circuit 406 when the detection circuit 404 detects that the power input 402 is not providing energy to the main unit 410 within the predetermined threshold. In this regard, the detection circuit 404 and the harvesting circuit 406 may be in communication either directly or, e.g., through a processor. The detection circuit 404 and/or the harvesting circuit 406 may also be in communication with the main unit 410 such that the main unit 410 may be notified if and when the source of energy is being switched.

Example Flowchart(s)

Embodiments of the present disclosure provide methods for providing for a controlled shutdown of a marine electronic device. Various examples of the operations performed in accordance with embodiments of the present disclosure will now be provided with reference to FIG. 7.

Figure 7:
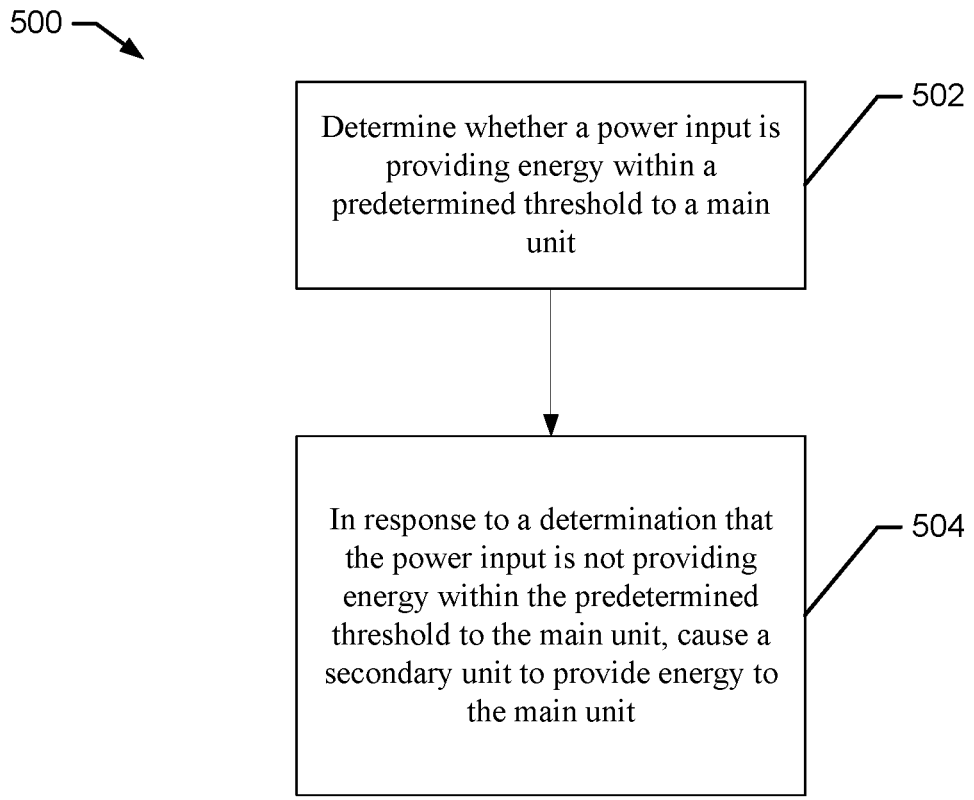
FIG. 7 shows an example method for providing a controlled shutdown of a marine electronic device, in accordance with some embodiments discussed herein.

FIG. 7 illustrates a flowchart according to an example method 500 for providing for a controlled shutdown of a marine electronic device, according to various example embodiments described herein. The operations illustrated in and described with respect to FIG. 7 may, for example, be performed by, with the assistance of, and/or under the control of one or more of the components described herein, e.g., in relation to system 200 and/or system 300.

Operation 502 may comprise determining whether a power input is providing energy within a predetermined threshold to a main unit. As described herein, the power input may be in connection with the main unit, and the power input may be configured to provide energy to the main unit. For example, in some embodiments, operation 502 may include using a detection circuit that is in communication with at least the power input to determine whether the power input is providing energy to the main unit within the predetermined threshold. Further, in some embodiments, the detection circuit may be configured to detect a voltage level of the amount of energy traveling from the power input to the main unit, and the predetermined threshold may be a voltage value or a range of voltage values. The components discussed above with respect to systems 200 and/or 300 may, for example, provide means for performing operation 502.

Operation 504 may comprise causing, in response to a determination that the power input is not providing energy within the predetermined threshold to the main unit, a secondary unit to provide energy to the main unit. As described herein, the secondary unit may be configured to store energy for processing sonar data, and the secondary unit may be connectable to the main unit to provide the stored energy to the main unit. In some embodiments, for example, the secondary unit may be configured to process sonar data in a first mode, and the secondary unit may be configured to switch to a second mode in which the secondary unit provides power to the main unit from one or more capacitors of the secondary unit. Further, in some embodiments, operation 504 may include switching the secondary unit from the first mode to the second mode to initiate a controlled shutdown of the marine electronic device. Further, in some other embodiments, operation 504 may include using a harvesting circuit that connects the secondary unit to the main unit to cause the secondary unit to provide the stored energy to the main unit. The components discussed above with respect to systems 200 and/or 300 may, for example, provide means for performing operation 504.

FIG. 7 illustrates a flowchart of systems, methods, and/or computer program products according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 208 and/or the memory 308, and executed by, for example, the processor 204 and/or the processor 304. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the methods for controlled shutdowns of marine electronic devices may include additional, optional operations, and/or the operations described above may be modified or augmented.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A marine electronic device comprising:
a main unit;
a power input in connection with the main unit, wherein the power input is configured to provide energy to the main unit;
a secondary unit configured to store energy for processing sonar data, wherein the secondary unit is connectable to the main unit to provide stored energy to the main unit, wherein the secondary unit is configured to process sonar data in a first mode, and wherein the secondary unit is configured to provide power to the main unit from one or more capacitors of the secondary unit in a second mode;

a processor; and a memory including computer executable instructions, the computer executable instructions configured to, when executed by the processor, cause the processor to:

determine whether the power input is providing energy within a predetermined threshold to the main unit; and in response to a determination that the power input is not providing energy within the predetermined threshold to the main unit, cause the secondary unit to provide at least some of the stored energy to the main unit.

2. The marine electronic device of claim 1, wherein the secondary unit is configured to switch to the second mode in response to the determination that the power input is not providing energy within the predetermined threshold to the main unit.

3. The marine electronic device of claim 2, wherein the secondary unit is configured to switch from the first mode to the second mode to enable completion of a controlled shutdown of the marine electronic device.

4. The marine electronic device of claim 1, wherein the processor is further configured to, in response to the determination that the power input is not providing energy within the predetermined threshold to the main unit, cause the secondary unit to provide the stored energy to the main unit while the main unit completes a shutdown process.

5. The marine electronic device of claim 4, wherein the shutdown process includes saving data to the memory or to a second memory.

6. The marine electronic device of claim 4, wherein the processor is further configured to, in response to the determination that the power input is not providing energy within the predetermined threshold to the main unit, cause the secondary unit to provide the stored energy to the main unit while the main unit shuts down such that data is saved before the shutdown process is completed.

7. The marine electronic device of claim 1, wherein the processor is further configured to, in response to the determination that the power input is not providing energy within the predetermined threshold to the main unit, cause the secondary unit to provide the stored energy to the main unit until the secondary unit contains no energy.

8. The marine electronic device of claim 1, wherein the secondary unit includes one or more capacitors.

9. The marine electronic device of claim 1 further comprising a detection circuit in communication with at least the power input, wherein the detection circuit is used to determine whether the power input is providing energy to the main unit within the predetermined threshold.

10. The marine electronic device of claim 9, wherein the detection circuit is configured to detect a voltage level of the amount of energy traveling from the power input to the main unit, and wherein the predetermined threshold is a voltage value or a range of voltage values.

11. The marine electronic device of claim 1 further comprising a harvesting circuit connecting the secondary unit to the main unit, wherein the processor is configured to cause the secondary unit to provide the stored energy to the main unit through the harvesting circuit.

12. A method for providing for a controlled shutdown of a marine electronic device, the method comprising:

determining whether a power input is providing energy within a predetermined threshold to a main unit, wherein the power input is in connection with the main unit, wherein the power input is configured to provide energy to the main unit; and in response to a determination that the power input is not providing energy within the predetermined threshold to the main unit, causing a secondary unit to provide energy to the main unit, wherein the secondary unit is configured to store energy for processing sonar data, wherein the secondary unit is connectable to the main unit to provide at least some of the stored energy to the main unit, wherein the secondary unit is configured to process sonar data in a first mode, and wherein the secondary unit is configured to provide power to the main unit from one or more capacitors of the secondary unit in a second mode.

13. The method of claim 12, wherein the secondary unit is configured to switch to the second mode in response to the determination that the power input is not providing energy within the predetermined threshold to the main unit.

14. The method of claim 13, wherein the method further comprises switching the secondary unit from the first mode to the second mode to enable completion of a controlled shutdown of the marine electronic device.

15. The method of claim 12, wherein determining whether the power input is providing energy within the predetermined threshold to the main unit further comprises using a detection circuit that is in communication with at least the power input to determine whether the power input is providing energy to the main unit within the predetermined threshold.

16. The method of claim 15, wherein the detection circuit is configured to detect a voltage level of the amount of energy traveling from the power input to the main unit, and wherein the predetermined threshold is a voltage value or a range of voltage values.

17. The method of claim 12, wherein causing the secondary unit to provide energy to the main unit further comprises using a harvesting circuit that connects the secondary unit to the main unit to cause the secondary unit to provide the stored energy to the main unit.

18. A system for controlling a shutdown of a device, the system comprising:

a main unit;

a power input in connection with the main unit, wherein the power input is configured to provide energy to the main unit;

a secondary unit configured to store energy for a secondary purpose, wherein the secondary unit is connectable to the main unit to provide stored energy to the main unit, wherein the secondary unit is configured to process sonar data in a first mode, and wherein the secondary unit is configured to provide power to the main unit from one or more capacitors of the secondary unit in a second mode;

a processor; and a memory including computer executable instructions, the computer executable instructions configured to, when executed by the processor, cause the processor to:

determine whether the power input is providing energy within a predetermined threshold to the main unit; and in response to a determination that the power input is not providing energy within the predetermined threshold to the main unit, cause the secondary unit to provide at least some of the stored energy to the main unit.

19. The system of claim 18, wherein the secondary unit is configured to switch to the second mode in response to the determination that the power input is not providing energy within the predetermined threshold to the main unit.

20. The system of claim 19, wherein the secondary unit is configured to switch from the first mode to the second mode to enable completion of a controlled shutdown of the device.

\* \* \* \* \*